United States Patent
Soliman et al.

(10) Patent No.: US 8,099,106 B2
(45) Date of Patent: Jan. 17, 2012

(54) METHOD AND APPARATUS FOR CLASSIFYING USER MORPHOLOGY FOR EFFICIENT USE OF CELL PHONE SYSTEM RESOURCES

(75) Inventors: Samir S. Soliman, San Diego, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 11/212,083

(22) Filed: Aug. 24, 2005

(65) Prior Publication Data
US 2007/0049295 A1 Mar. 1, 2007

(51) Int. Cl.
*H04W 24/00* (2009.01)
(52) U.S. Cl. ............... 455/456.3; 455/440; 455/441; 455/453; 455/455; 375/142; 375/224; 342/114
(58) Field of Classification Search .......... 455/455, 455/453, 440, 441, 456, 456.3; 375/224, 375/142; 342/114
See application file for complete search history.

(56) References Cited

U.S. PATENT DOCUMENTS

| | | | |
|---|---|---|---|
| 5,841,396 A | 11/1998 | Krasner | |
| 6,002,363 A | 12/1999 | Krasner | |
| 6,052,598 A * | 4/2000 | Rudrapatna et al. | 455/456.1 |
| 6,408,186 B1 * | 6/2002 | Park et al. | 455/456.1 |
| 6,421,002 B2 | 7/2002 | Krasner | |
| 6,445,728 B1 * | 9/2002 | Byun | 375/142 |
| 6,456,652 B1 * | 9/2002 | Kim et al. | 375/224 |
| 6,490,460 B1 * | 12/2002 | Soliman | 455/522 |
| 6,611,688 B1 * | 8/2003 | Raith | 340/992 |
| 6,760,882 B1 * | 7/2004 | Gesbert et al. | 714/774 |
| 6,768,727 B1 * | 7/2004 | Sourour et al. | 370/335 |
| 6,834,195 B2 * | 12/2004 | Brandenberg et al. | 455/456.3 |
| 7,376,429 B2 | 5/2008 | Choukroun et al. | |
| 7,895,813 B2 | 3/2011 | Andria et al. | |
| 2003/0125069 A1 * | 7/2003 | Lee | 455/522 |
| 2004/0017311 A1 * | 1/2004 | Thomas et al. | 342/450 |
| 2004/0203857 A1 * | 10/2004 | Wang | 455/456.1 |
| 2005/0124354 A1 | 6/2005 | Durgin | |

FOREIGN PATENT DOCUMENTS

DE 10356496 7/2005
(Continued)

OTHER PUBLICATIONS

International Search Report, PCT/US2006/033260; Feb. 16, 2007; Qualcomm Incorporated.

(Continued)

*Primary Examiner* — Nimesh Patel
(74) *Attorney, Agent, or Firm* — Arnold J. Gum

(57) ABSTRACT

A system and method for classifying the user's morphology, and using that classification to control the UE in order to provide more efficient operation of the UE. The classification may be used to assist the user in determining its location more efficiently, without needless interruption or unnecessary use of system resources. The morphology classifier may classify the user's morphology into at least one of the following classifications: indoor, outdoor, local coverage, no local coverage, proximate to a base station, stationary, moving, urban, suburban, rural, deep indoor, mid indoor, and indoor near window. The classification may be used by the UE or by a remote server that utilizes the classification to develop assistance data that is sent to the UE.

52 Claims, 10 Drawing Sheets

FOREIGN PATENT DOCUMENTS

| | | |
|---|---|---|
| DE | 10356496 A1 | 7/2005 |
| EP | 1519608 A | 3/2005 |
| JP | 2004061464 A | 2/2004 |
| JP | 2005537470 | 12/2005 |
| JP | 2007518979 T | 7/2007 |
| WO | WO2004021036 | 3/2004 |
| WO | 2005004520 | 1/2005 |
| WO | 2005004520 A2 | 1/2005 |
| WO | WO2005065320 A2 | 7/2005 |

OTHER PUBLICATIONS

International Preliminary Report on Patentability, Chapter I, The International Bureau of WIPO, Feb. 26, 2008.

Written Opinion—PCT/US2006/033260, International Search Authority, European Patent Office, Feb. 16, 2007.

* cited by examiner

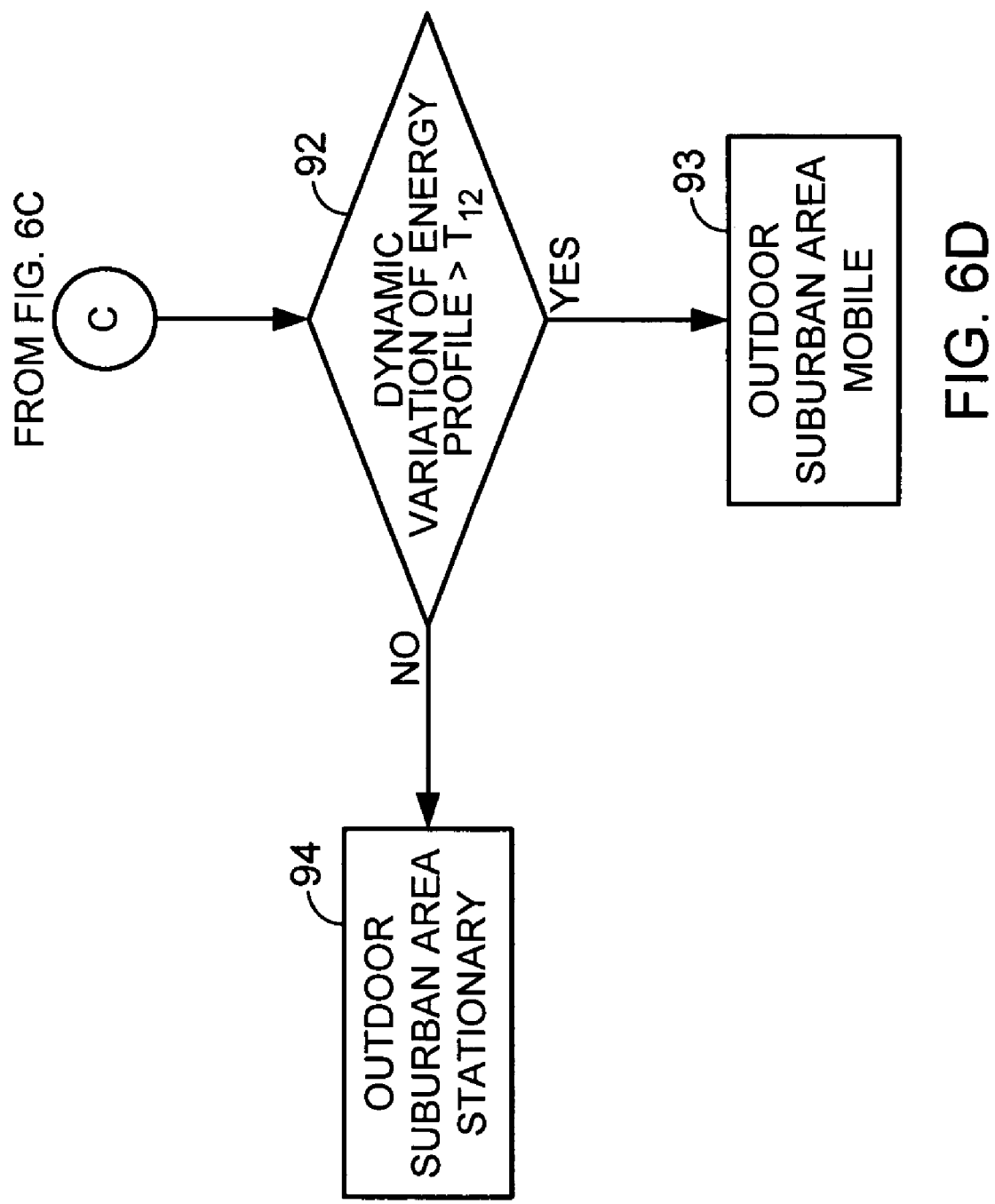

SIGNAL DETECTION PROBABILITY AS A FUNCTION OF SEARCH WINDOW SIZE

METHOD AND APPARATUS FOR CLASSIFYING USER MORPHOLOGY FOR EFFICIENT USE OF CELL PHONE SYSTEM RESOURCES

BACKGROUND

1. Field

This application generally relates to wireless user equipment, such as wireless devices that use wireless signals to determine the location of devices such as cell phones.

2. Background Information

Wireless cell phones have become almost universal in the modern world. The primary purpose of cell phones was, and still is, to provide wireless voice communication services. However, data communication is becoming increasingly important, and a host of additional features are being implemented in cell phones.

When adding features to a cell phone, the effect upon system performance must be considered. Additional features increase the load upon the cell phone's system, decreasing system performance.

The computing system of a cell phone is limited in size, capacity, and battery power. In order to make efficient use of its limited resources, the cell phone may communicate with other network resources using its communication capabilities; in other words, the cell phone may "off-load" some of its computationally intensive tasks to servers with much greater computation capabilities. For example, some position location functions may be performed by a dedicated server, such as a Position Determination Entity (PDE). To aid the location measurements, the PDE may provide assistance data to the cell phone. However, the assistance data is usually generalized for a wide range of conditions, and therefore under some circumstances may not be useful, or just not fully optimized.

Some cell phone operations are more efficiently performed by the cell phone, and still other functions must by necessity be performed by the cell phone itself. One such required function is actual position location data collection. In handset-based position location technologies, the wireless device carries out the fundamental location measurements. These position location operations can be particularly demanding upon system performance; for example, an attempted location fix may consume several seconds or more, during which time the phone's communication functionality may be diminished. Such periods of temporary diminished functionality can be very annoying and potentially disruptive to a user whose ability to make or receive a phone call during this period may be affected.

In all handset-based position location technologies, location measurements are made by the user equipment (UE). Measurements may be made of signals from base stations or GPS satellites, or signals from any other location reference sources. In the most efficient handset-based position location solutions, wireless assistance is provided to the handset from a wireless network; particularly, the network sends assistance data to the user equipment (UE) aimed at increasing the signal detection reliability and/or decreasing the time required for completing the measurements. Conventional assistance data may include a variety of information, such as a list of visible signal sources, information indicating the expected code phase, the code phase window size, the signal Doppler, and the Doppler window size. One type of assistance data provides information about the signal modulation, for example the assistance data could provide the sequence of modulation bits.

SUMMARY

A system and method are described herein for classifying the user's morphology (i.e., the characteristics of the user's location as it relates to wireless signals), and using that classification in a way to provide more efficient operation of the UE. For example, the classification may be used to assist the UE in determining its location more efficiently, without needless interruption or unnecessary use of system resources.

A wireless apparatus for efficiently performing position location operations is described comprising a receiver including a system for measuring a first set of signals received in the UE from RF signal sources within range of the UE, to provide a first set of data measurements. A morphology classifier is provided for classifying the user's morphology responsive to the first set of data measurements. A control system, responsive to the morphology classification, controls the UE in one embodiment to determine whether to perform operations including at least one of fixing position location determinations, and sending unsolicited sensitivity assistance data to the UE, thereby conserving system resources. The wireless apparatus may be used in a communication system in which the RF signal sources comprise a plurality of base stations in a CDMA network, and the receiver includes means for taking data measurements including at least two of Ec/No, RSSI, RTD, the number of pilots in the found set, and the dynamic variation of energy profiles among the found pilots. The morphology classifier may classify the user's morphology into at least one of the following classifications: indoor, outdoor, local coverage, no local coverage, proximate to a base station, stationary, moving, urban, suburban, rural, deep indoor, mid indoor, and indoor near window. Furthermore, the wireless apparatus may comprise a system for determining a level of confidence in the classification, and the control system operates responsive to the level of confidence and the morphology classification.

A method of classifying morphology at the location of a UE that communicates using RF (Radio Frequency) signals is described that can assist the UE in operating more efficiently, such as to assist the UE in efficiently performing position location operations. The method comprises measuring a first set of signals received in the UE from RF signal sources within range of the UE, to provide a first set of data measurements. Responsive to the first set of data measurements, the user's morphology is classified, and optionally the level of confidence in that classification may be determined. The UE is controlled responsive to the morphology classification, for example to determine whether to perform operations including at least one of fixing position location determinations, and sending unsolicited sensitivity assistance data to the UE, thereby conserving system resources. In some embodiments, the RF signal sources may include a plurality of base stations, and the data measurements include the SNR (Signal to Noise Ratio) of each of the RF signal sources, and the RSSI (Received Signal Strength Indicator). The data measurements may include AFLT (Advanced Forward Link Trilateration) measurements from base stations, and/or the RF signal sources may include a plurality of positioning satellites, and the data measurements include GPS (Global Positioning System) measurements. In one specific example, the RF signal sources comprise a plurality of base stations in a CDMA (Code Division Multiple Access) network, and the data measurements include at least two of Ec/No, RSSI, RTD (Round Trip Distance), the number of pilots in the found set, and the dynamic variation of energy profiles among the found pilots. The morphology may be classified in a variety of classifications, for example indoor, outdoor, city, rural, and so forth.

The previously known location of the UE may be considered while classifying the morphology.

BRIEF DESCRIPTION OF THE DRAWINGS

For a more complete understanding, reference is now made to the following detailed description of the embodiments as illustrated in the accompanying drawing, wherein:

FIGS. 6A, 6B, 6C, and 6D together show a flow chart of operations in one embodiment to classify the user's morphology.

In the various figures of the drawings, like reference numbers are used to denote like or similar elements.

DETAILED DESCRIPTION

Glossary of Terms and Acronyms

Figure 1:
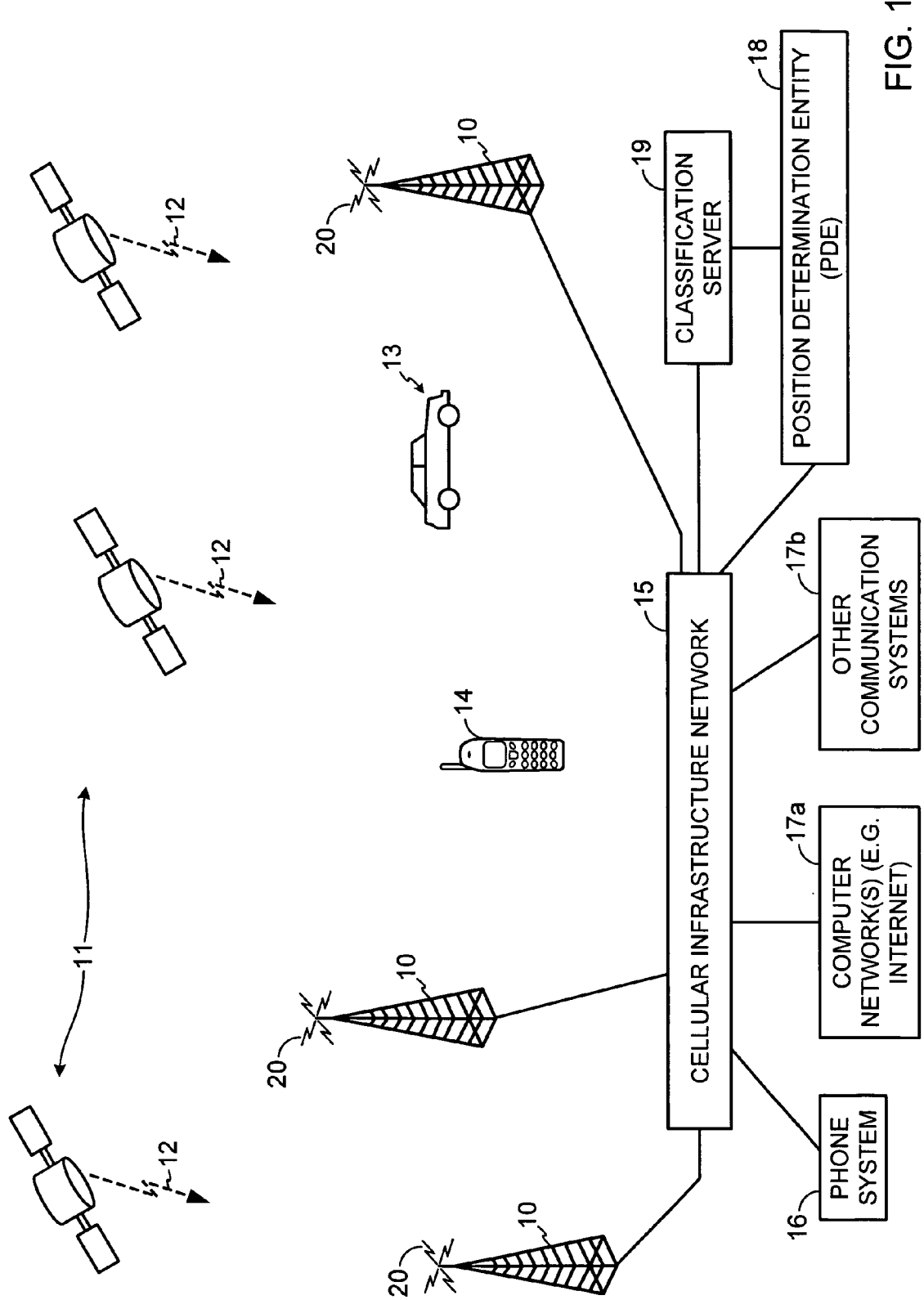
FIG. 1 illustrates a communication and position location system environment that includes satellites emitting GPS signals, a cellular communication system that includes a plurality of base stations, and a UE in communication with one or more of the base stations.

The following terms and acronyms are used throughout the detailed description:

A-GPS: Assisted GPS. A location technology in which special assistance to the GPS acquisition process is provided by a location server, which can reduce acquisition time and improve sensitivity.

CDMA: Code Division Multiple Access. A high-capacity digital wireless technology that was pioneered and commercially developed by QUALCOMM Incorporated.

Chip: a symbol, also the smallest part of a modulation (e.g., a phase reversal) of a pseudorandom (PN) sequence.

Clusters: subsets of radio channel propagation delay values observed to be close to each other. See Propagation Delay profile. The typical propagation delay profile is composed of delay clusters. In most cases, each cluster corresponds to a group of scatterers belonging to a certain object or certain objects. For example, the windows of a large nearby building in an urban environment can form a group of scatterers, and the received signal reflected by them would form a cluster in the propagation delay profile.

DFT: Discrete Fourier Transform.

Dynamic Variation of Energy Profile: the measure of time-variability of the energy profile (see Energy Profile). An example of measuring the dynamic variation is to calculate the differential values between subsequent (in time) energy profile values and calculate their RMS (root-mean-squared) value. With appropriate normalization to discount the average signal power, the dynamic variation of the energy profile becomes a good indicator of the mobility of the transmitter and receiver or of the mobility of the scattering elements in their radio environment.

Ec/No: a measure of the signal-to-noise ratio in CDMA systems.

Energy Profile: the received power as a function of the propagation delay. See Propagation Delay Profile. In the more general, dynamic case, the energy profile is a 2-D function, where the first variable represents the excess propagation delay values, while the second variable represents the absolute measurement time.

GPS: Global Positioning System. A technique utilizing distance measurements to GPS satellites to determine three-dimensional location (including altitude). Although the term GPS is often used to refer to the U.S. Global Positioning System, the meaning of this term includes other global positioning systems, such as the Russian Glonass System and the planned European Galileo System. In some systems, the term Satellite Positioning System (SPS) is used in substitution for the GPS terminology. For illustrative purposes, the invention herein is described in terms of the current U.S. GPS System. It should be obvious, however, to one skilled in the art that this invention may be applied to a variety of SPS systems that utilize similar signaling formats, as well as to future variations of the U.S. GPS System.

GSM: Global System for Mobile, another widely-used digital wireless technology.

mA: milliampere.

Morphology: environment of the UE from a Radio Frequency (RF) viewpoint.

MS: Mobile Station, such as a cell phone that has a baseband modem for communicating with one or more base stations, and position location capabilities. MS's referenced in this disclosure typically include a GPS receiver.

PCS: Personal Communication System.

PDE: Position Determination Entity. A system resource (e.g., a server), typically within the CDMA network, working in conjunction with one or more GPS reference receivers, capable of exchanging GPS-related information with UE. In UE-Assisted A-GPS session, the PDE can send GPS assistance data to the UE to enhance the signal acquisition process. The UE can return information such as pseudorange measurements back to the PDE, which is then capable of computing the position of the UE. In a UE-Based A-GPS session, the UE can send computed position results to the PDE.

Pilot: a signal received from a base station, using CDMA terminology.

Position location assistance data: information supplied from a remote server (e.g., a PDE) for the purpose of assisting the UE in determining its position more efficiently, for example a list of visible satellites, an approximate ranges to the satellites, an approximate satellite Doppler, and a list of visible ground based location signal transmitters.

Propagation Delay Profile: a way to characterize the radio channel between transmit and receive antennas. The radio channel is often composed of a number of distinct rays. Non-line-of-sight rays suffer reflection and also possible refraction. Reflected signals will incur excess propagation delay (relative to the line-of-sight), which is characteristic of their propagation path. Spread spectrum systems, such as CDMA, are able to detect the relative delays of these distinct received signal components also called multipath components. The resolution to which multipath components can be distinguished is inversely proportional to the bandwidth of the communication signal. The propagation delay profile is also called multipath delay profile.

RF: radio frequency.

RSSI: Received Signal Strength Indicator. A measure of the absolute received power. The received power includes that of the desired signal, the multiple access interference noise and other noise sources, all within the operating frequency. An RSSI measure is typically produced by the receiver's Automatic Gain Control function.

RTD: round trip distance from the UE to the base station in communication with the UE.

SNR: signal-to-noise ratio, comparable to Ec/No in CDMA technology.

SV: Space Vehicle. One major element of the Global Positioning System is the set of SVs orbiting the Earth and broadcasting uniquely identifiable signals.

UMTS: Universal Mobile Telephone Service. A third generation cellular standard utilizing a form of CDMA, designed to be the successor to GSM.

UE: User Equipment. Any type of wireless communications device used by a user. Includes cellular, cordless, PCS, or other types of wireless telephone devices, pagers, wireless personal digital assistants, notebook computers with wireless access, or any other wireless mobile device, two-way radios, walkie-talkies, or other type of communications transceiver, or user equipment, regardless of whether or not they have valid SIM or USIM identifiers.

Overview of GPS System and User Equipment

Figure 2:
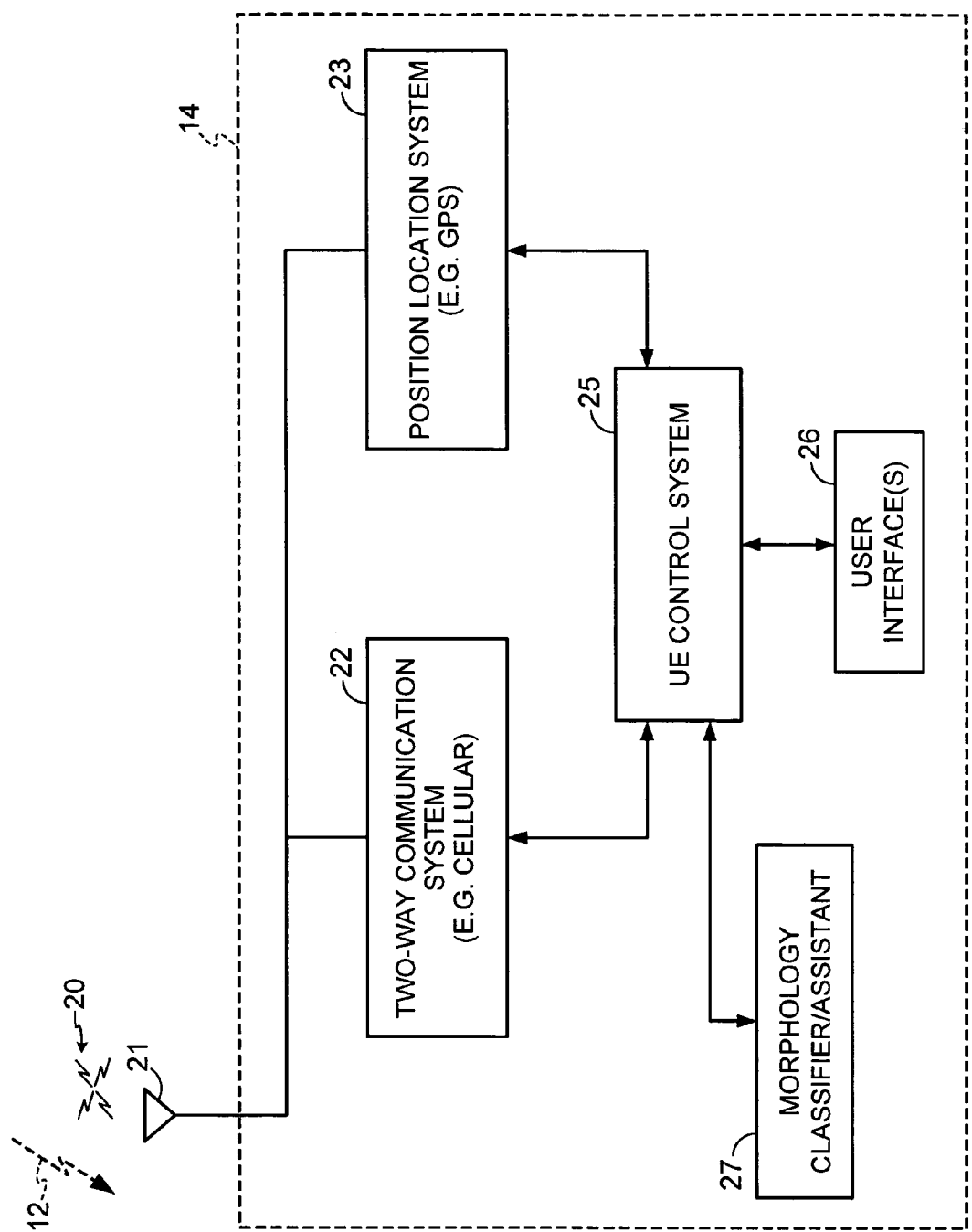
FIG. 2 is a block diagram of a UE that includes a morphology classifier/helper.
Figure 3:
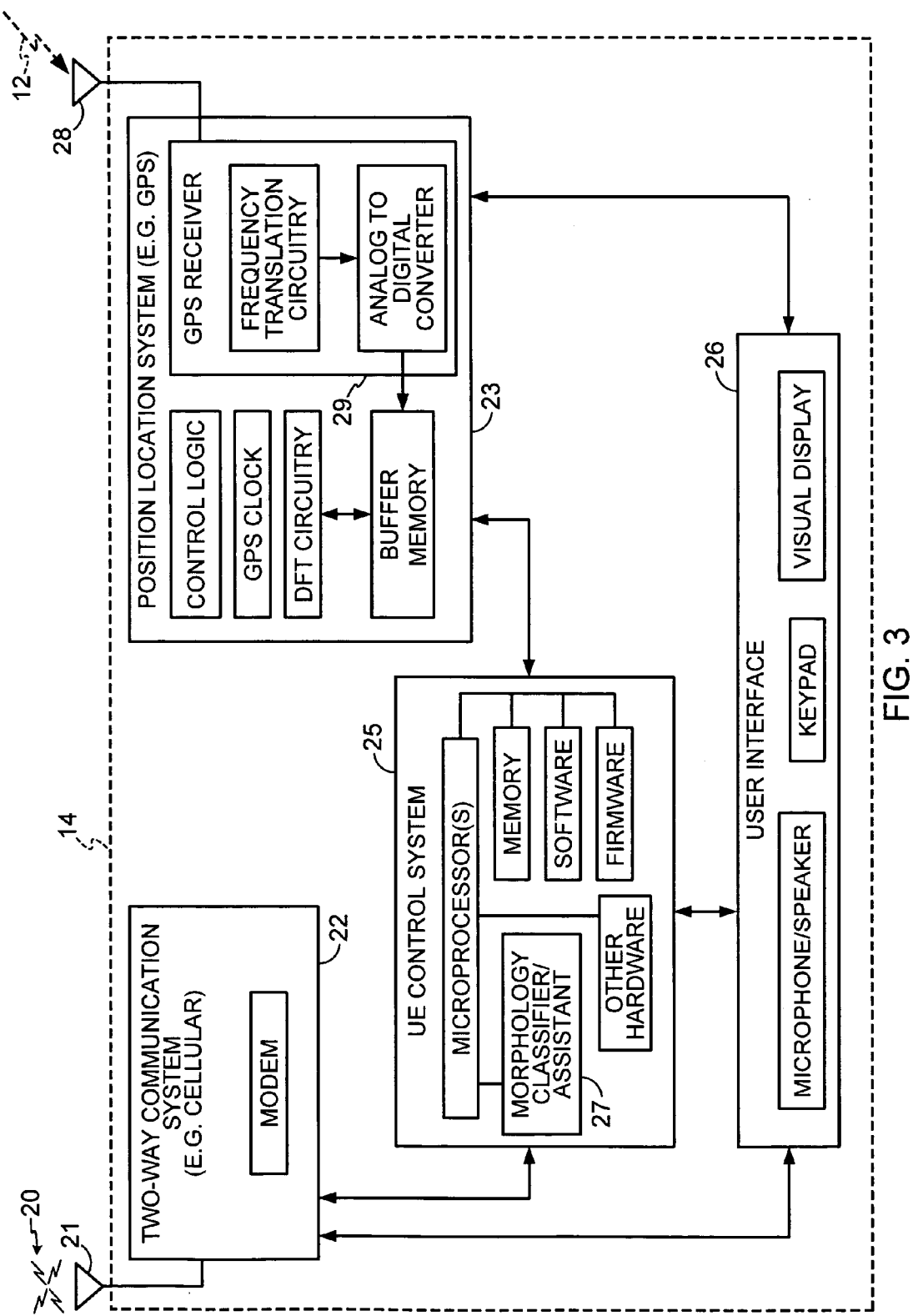
FIG. 3 is a block diagram of one embodiment of a UE that includes a morphology classifier/helper.

Reference is now made to FIGS. 1, 2, and 3. FIG. 1 illustrates a GPS environment that includes a plurality of GPS satellites (SVs) 11 that emit GPS positioning signals 12, a plurality of land-based base stations 10, and user equipment (UE) 14 such as a cell phone. The base stations 10 are connected to a cellular infrastructure network 15, which allows it to communicate with other networks and communication systems, such as a phone system 16, computer networks 17a, such as the internet, and other communication systems 17b. Thus, the base stations 10 may comprise part of a communication network that may include a number of additional communication systems in communication with the base stations.

The UE 14 is described elsewhere herein, for example with reference to FIG. 2, but typically includes a GPS receiver and a two-way system for communication with the base stations using two-way communication signals 20. It should be apparent that the GPS receiver could be implemented in a wide variety of user equipment 14 (other than cell phones) that communicate with one or more base stations 10. Furthermore, for ease of description herein, the position location system disclosed herein may be a GPS system; it should be recognized that the system described herein could be implemented in any satellite-based positioning systems.

In FIG. 1, the UE 14 is illustrated as a hand-held device, although it may have any suitable implementation, such as a built-in device in a vehicle such as an truck or automobile 13. The UE 14 may be carried by a user who is standing, walking, traveling in a truck or automobile, or on public transportation, for example. The UE 14 may be carried in the automobile 13 as it travels on its journey. It should be apparent that the user equipment may be positioned in a wide variety of environments, and may be stationary or moving.

The GPS satellites (SVs) 11 comprise any group of satellites broadcasting signals that are utilized for positioning a GPS receiver. Particularly, the satellites are synchronized to send wireless positioning signals 12 phased to GPS time. These positioning signals are generated at a predetermined frequency, and in a predetermined format. In a current GPS implementation, each SV transmits a civilian type of GPS signal on the L1-frequency band (at 1575.42 MHz) in a format that is in accordance with GPS standards. When the GPS signals are detected by a conventional GPS receiver in the UE, the GPS system 23 attempts to calculate the amount of time elapsed from transmission of the GPS signal until reception at the UE. In other words, the GPS system calculates the time required for each of the GPS signals to travel from their respective satellites to the GPS receiver. The pseudorange is defined as: $c \cdot (T_{user} - T_{SV}) + cT_{bias}$, where c is the speed of light, $T_{user}$ is the GPS time when the signal from a given SV is received, $T_{SV}$ is the GPS time when the satellite transmitted the signal and $T_{bias}$ is an error in the local user's clock, normally present in the GPS receiver. Sometimes pseudorange is defined with the constant "c" omitted. In the general case, the receiver needs to resolve four unknowns: X, Y, Z (the coordinates of the receiver antenna), and $T_{bias}$. For this general case, resolving the four unknowns usually requires measurements from four different SVs; however, under certain circumstances, this constraint can be relaxed. For example, if an accurate altitude estimate is available, then the number of SV's required can be reduced from four to three. In so-called assisted GPS operation, $T_{SV}$ is not necessarily available to the receiver and instead of processing true pseudoranges, the receiver relies primarily upon code phases. In a current GPS implementation, the code phases have one-millisecond time ambiguities, since the PN codes repeat every one millisecond. Sometimes the data bit boundaries may be ascertained, thus producing only 20-millisecond ambiguities.

The base stations 10 comprise any collection of base stations utilized as part of a communication network that communicates with the UE 14 using wireless signals 20. The base stations are connected to the cellular infrastructure network 15, which provides communication services with a plurality of other communication networks such as a public phone system 16, computer networks 17a such as the internet, a position determination entity (PDE) 18 (defined above), and a variety of other communication systems shown collectively in block 17b. The PDE 18 may be connected to (or include) a GPS reference receiver (not shown) that communicates with the PDE 18 to provide useful information in determining position, such as SV position (ephemeris) information.

The ground-based cellular infrastructure network 15 typically provides communication services that allow the user of a cell phone to connect to another phone over the phone system 16; however the base stations 10 could also be utilized to communicate with other devices and/or for other communication purposes, such as an internet connection with a hand-held personal digital assistant (PDA). In one embodiment, the base stations 10 are part of a GSM communication network; however, in other embodiments other types of synchronous (e.g., CDMA2000) or asynchronous communication networks may be used.

A classification server 19 may also be provided to assist the UE in classifying its morphology, as discussed herein. The classification server 19 may comprise, for example, a server or a group of servers that are designed and programmed to receive information and process this information to classify the morphology of the UE, or to assist the UE in making the classification.

FIG. 2 is a block diagram of one embodiment of the mobile device 14, which includes communication and position location systems. A cellular communication system 22 is connected to an antenna 21 that communicates using the cellular signals 20. The cellular communication system 22 comprises suitable devices, such as a modem, hardware, and software for communicating with and/or detecting signals 20 from base stations, and processing transmitted or received information.

A GPS position location system 23 in the UE is connected to the antenna 21 to receive positioning signals 12 transmitted from GPS satellites. The GPS system 23 comprises any suitable hardware and software for receiving and processing GPS signals and for performing calculations. In some assisted GPS implementations the final position location calculations (e.g., latitude and longitude) are performed at a remote server such as the PDE 18, based upon code phases and other information sent from the GPS receiver to the remote server. These implementations are called MS-assisted.

A UE control system 25 is connected to both the two-way communication system 22 and the position location system 23. The UE control system 25 includes any appropriate structure, such as one or more microprocessors, memory, other hardware, firmware, and software to provide appropriate control functions. It should be apparent that the processing steps described herein are implemented in any suitable manner using hardware, software, and/or firmware, subject to control by the microprocessor.

The control system 25 is also connected to a user interface 26, which includes any suitable components to interface with the user, such as a keypad, a microphone/speaker for voice communication services, and a display (e.g., a backlit LCD display). The mobile device control system 25 and user interface 26, connected to the position location system 23 and two-way communication system 22, provide suitable input-output functions for the GPS receiver and the two-way communication system, such as controlling user input and displaying results.

In some embodiments, the UE includes a morphology classifier/helper 27 as shown in FIG. 2. The classifier 27 may be connected to, or may be a part of, the UE control system 25, and comprises any suitable combination of hardware and software. The morphology classifier/helper 27 performs functions as appropriate to determine classification of the morphology at the UE's location, and it may work together with the classification server 19 (FIG. 1) to determine this classification.

FIG. 3 is a block diagram of one embodiment of the mobile device 14. As in FIG. 2, the cellular communication system 22 is connected to an antenna 21 that communicates using the cellular signals 20, and comprises suitable devices, such as a modem, hardware, and software for communicating with and/or detecting signals 20 from base stations, and processing transmitted or received information.

In FIG. 3, a separate GPS antenna 28 is used to receive GPS positioning signals 12. In some embodiments, a single antenna can be used to support multiple bands such as cellular, GPS and PCS. The GPS system 23 as shown in FIG. 3 comprises a GPS receiver 29 that includes frequency translation circuitry and an analog-to-digital converter, a GPS clock, control logic to control the desired functions of the GPS receiver, and any suitable hardware and software for receiving and processing GPS signals and for performing any calculations necessary to determine position using any suitable position location algorithm. In the illustrated embodiment, the analog-to-digital converter is connected to the buffer memory in the position location system, and the buffer memory is coupled to the DFT circuitry to provide and store the data during the DFT operation. In some assisted GPS implementations the final position location calculations (e.g., latitude and longitude) are performed at a remote server such as the position determination entity (PDE), based upon code phases and other information sent from the GPS receiver to the remote server. Some examples of GPS systems are disclosed in U.S. Pat. Nos. 5,841,396, 6,002,363, and 6,421,002, by Norman F. Krasner.

The UE control system 25, connected to both the two-way communication system 22 and the position location system 23, as shown in FIG. 3 includes one or more microprocessors, memory, other hardware, firmware, and software to provide appropriate control functions for the systems to which it is connected. It should be apparent that the processing steps described herein can be implemented in any suitable manner using hardware, software, and/or firmware, subject to control by the microprocessor.

The user interface 26 shown in FIG. 3 includes a keypad, a microphone/speaker for voice communication services, a display (e.g., a backlit LCD display), and any other suitable interface. The mobile device control system 25 and user interface 26 provide suitable input-output functions for the GPS receiver and the two-way communication system.

In the embodiment of FIG. 3, the morphology classifier/helper 27 is shown within the UE control system 25, connected to the microprocessor. Generally, the classifier comprises any suitable combination of hardware and software, and performs functions as appropriate relating to classifying the morphology at the UE's location. The classifier 27 may work together with the classification server 19 (FIG. 1) to determine this classification, or it may work by itself in some or all of the functions for determining classification.

Overview

A system is described herein for determining characteristics of the user's location as it relates to wireless signals (i.e., the user's morphology) to provide more efficient operation of the UE, for example to assist the user in determining its location more efficiently, without needless interruption or unnecessary use of system resources. The general approach described herein is to make observations, process and extract information from those measurements, and classify the user location (e.g., as either good or poor from the RF standpoint, such as indoor/outdoor) and then control the UE dependent upon that classification, such as to predict the strength of the not-yet-measured positioning signals based on that classification.

One approach to classifying the user morphology of the UE could be based upon a hypothesis that the characteristics of the observable signals and their numbers can be correlated between different groups of location reference signals. For example, if all base station signals are weak, then the UE is probably indoors, and therefore the satellite signals will likely be weak.

In one embodiment, a method and apparatus is described herein in which the wireless assistance data that is sent to "position location capable" user equipment ("UE") is determined responsive to one or more characteristics of signals received by the UE. Generally, the method in this embodiment involves taking some aspect of the observed signal (e.g., the signal strength, or the number of found signals, or signal-to-noise ratio, or round trip delay, or energy profile, or propagation delay profile, or the size of the search set), and using this information to provide useful information to the UE, such as whether to attempt to determine position location, or to postpone it to another time. In addition to the information types listed above, the expected signal strength could also be provided to the user equipment. This information could be provided explicitly, or the base station could use it to formulate other assistance data.

Description

Figure 4:
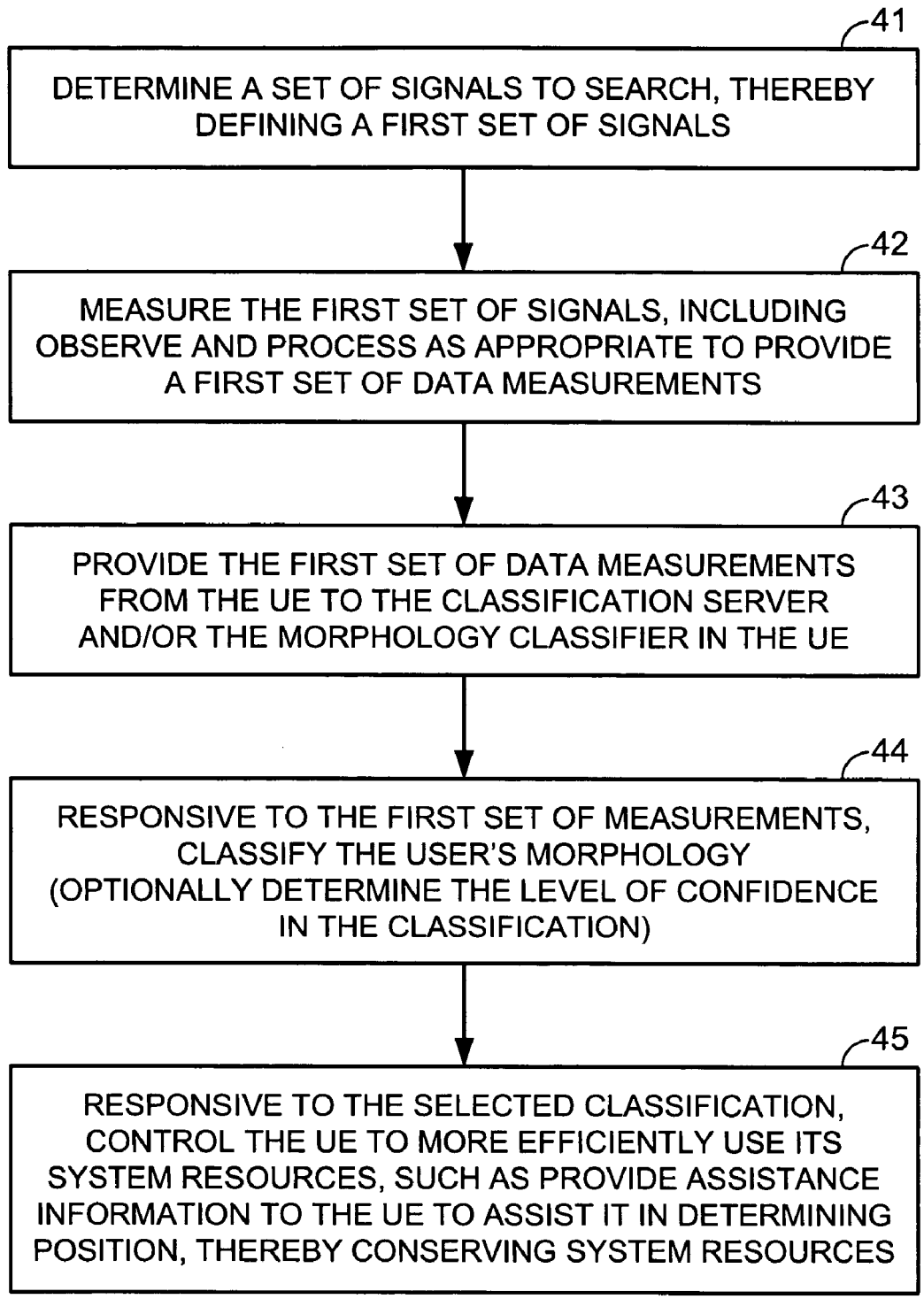
FIG. 4 is a flow chart of a method of classifying user morphology, and using the resulting classification to control the UE to operate more efficiently, thereby conserving system resources.
Figure 5:
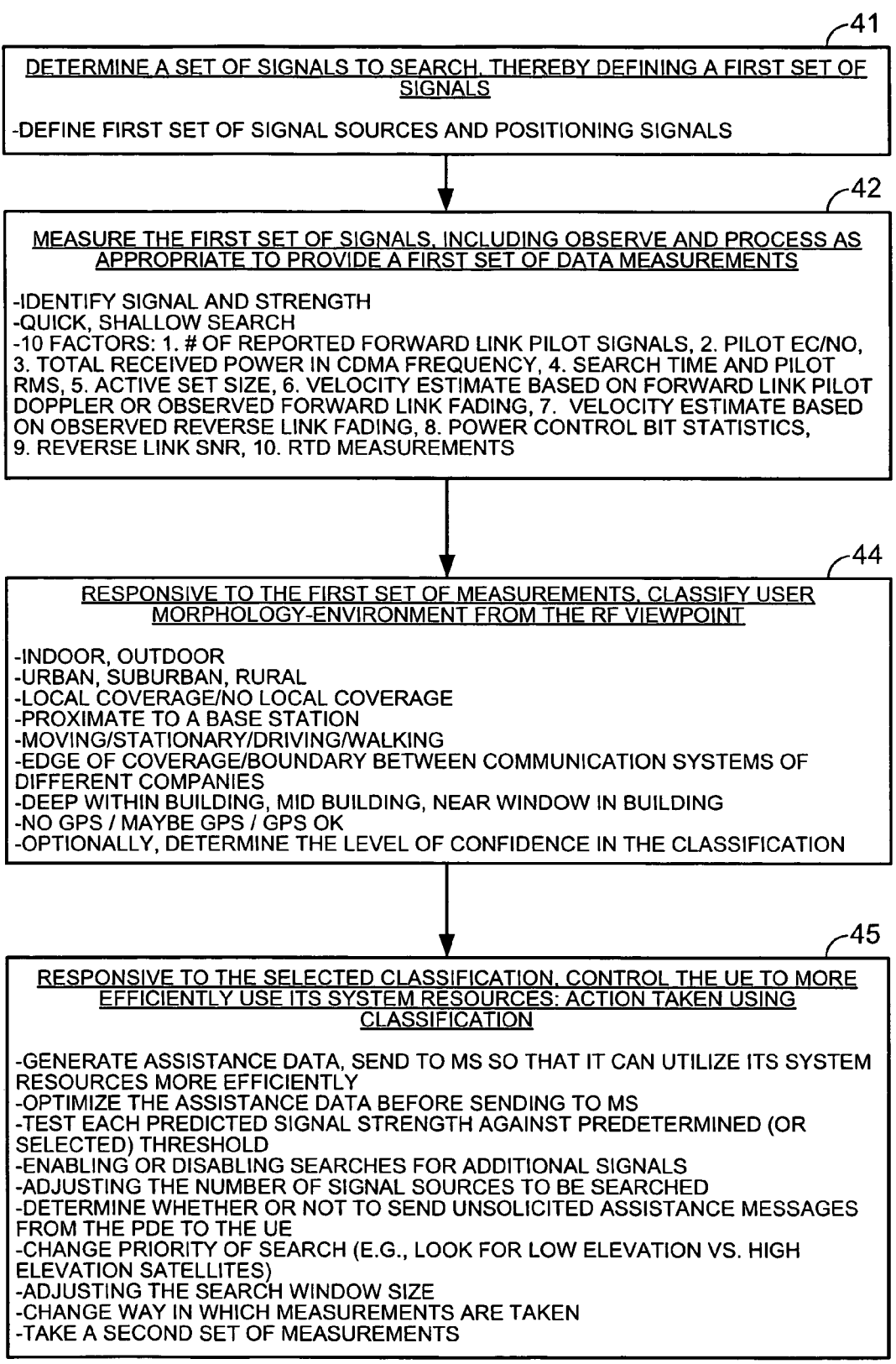
FIG. 5 is a flow chart as in FIG. 4, including more specific detail and examples within the flow chart.

Reference is now made to FIGS. 4 and 5 which are flow charts that illustrate a method of classifying user morphology, and using the resulting classification to control the UE to operate more efficiently, thereby conserving system resources. More particularly, FIG. 4 is a flow chart that illustrates the steps in general terms, and FIG. 5 is a more detailed flow chart of FIG. 4 (omitting step 43 for convenience).

Define a Set of Signals to Search, to Define a First Set of Signals

At 41, a set of signals is defined as appropriate. This step may include defining a group of AFLT signals, or GPS signals, or some combination thereof, for example.

The set of signals is defined in any suitable manner, such as by a search, or by knowledge from prior searches, or some combination thereof. In some embodiments, a certain number of signals may be initially searched in order to find the signals that are strongest, and then the strongest signals are chosen for a more thorough search.

Measure Signal Qualities

At 42, the first set of signals is measured. This step includes observing and processing the observed data as appropriate, thereby providing a first set of data measurements. Advantageously, the data measurements may include those normally taken during control communications between a base station and the UE, and in such an embodiment, no additional measurement features need be implemented in the UE, which is advantageous from an implementation-cost standpoint. However, in some embodiments, it may be useful to implement measurements in addition to those already implemented.

In a CDMA system, for example, some of the useful data measurements may include:
1) Number of reported forward link pilot signals;
2) Pilot Ec/No for one or more of the pilot signals;
3) Total received power in CDMA frequency, or RSSI;
4) Search time and pilot RMS;
5) Active Set size;
6) Velocity estimate based on forward link pilot Doppler or dynamic variation of energy profile;
7) Velocity estimate based on observed reverse link Doppler or dynamic variation of energy profile;
8) Power control bit statistics;
9) Reverse link SNR;
10) RTD measurements; and
11) Energy profiles.

In some scenarios it may not be necessary to make full measurements (i.e., it may not be necessary to take all the measurements normally made). In other words, partial measurements, including only those of the desired qualities, may be made. In one example, the Ec/No and RSSI are used to determine the expected signal strengths of future measurements; which in turn may be used in determining the assistance data to be used for those future measurements.

Provide Data Measurements from the UE to the Classification Server and/or the Morphology Classifier/Helper At 43, the data measurements are sent to the morphology classifier/helper 27 in the UE (shown in FIGS. 2 and 3) and/or to the remote classification server 19 (shown in FIG. 1). This step may include a simple matter of communicating the information directly from the UE, or some processing may be involved to process the received data in some manner to provide more useful information and/or to delete unnecessary information. For example, it may be more efficient to perform initial processing steps in the morphology classifier/helper in the UE, and then send this processed information to the classification server.

The above prediction could be carried out by either the UE or the base station, or some combination of the UE and base station as useful or appropriate. If the base station is used to perform the classification, some partial measurements are communicated from the UE to the base station, or the base station may use reverse link measurements. Carrying out the signal strength prediction by the base station has an advantage in that the base station's knowledge of the local signal propagation environment can be utilized. For example, the environment profile may be rural, where weak CDMA signals don't necessarily imply weak GPS signals, or the environment may be urban where weak CDMA signals do imply weak GPS signals with higher certainty.

If the signal strength prediction is carried out by the base station, then the predicted values could be conveyed back to the UE as separate parameters included in the assistance data, or the predicted value could be used when generating the other parameters included in the assistance data.

Classify User Morphology

At 44, responsive to the first set of measurements, the user's morphology is classified; e.g., the user's environment from an RF viewpoint, as seen by the UE, is classified, and optionally the level of confidence in the classification is determined (for example on a scale of zero to one). The classification of user location (and the optional level of confidence) may be based on any combination of the available types of data measurements and information available therefrom, such as those listed above. Examples of different classification methods are described herein (see Table 1 below and FIGS. 6A-6D, for example).

In addition, historical information and the previously known location may be used to classify location. For example, if the previous morphology was outdoor rural, it is likely that the current morphology is also outdoor rural; however if the previous morphology was outdoor urban moving, then it is much less certain that the morphology will remain unchanged.

The optional confidence level could be determined, for example, as a refinement to the individual classification decision steps. Each one, or some, of the binary thresholding decisions shown in FIGS. 6A-6D may be replaced by a weighting function. The weighting function would assign weighting factors to the two possible outcomes of each decision. The weighting factors could be chosen such that they always add up to one for a given decision, in which case the weighting factors can be construed as approximate likelihood estimates. For the chosen final outcome, the confidence would be determined as the product of all weighting factors along the path leading to that outcome. Higher confidence means higher reliability of the decision. For each decision, the weighting factor can be determined by an appropriately chosen function that has the decision input parameter as its argument. The previously used decision threshold could be used as a second argument to the weighting function, but it could also be omitted, in which case the weighting factors could be determined based on, for example, solely on the input parameter and a look-up table. (Naturally, if the input parameter was close to the previously used decision threshold, then the look-up table would be expected to output weighting factors close to 0.5, 0.5.) If for some of the decisions we chose not to implement the likelihood estimation, then for those we could still use a simple weighting function that produces zero or one according to the previously used threshold. This way the confidence of the final decision can still be calculated the same way as described above.

Many different types of classifications can be made. In one example, the morphology classifications generally include indoor, outdoor, local coverage, no local coverage, proximity to a base station, stationary, moving, urban, suburban, rural, deep indoor, mid indoor, and indoor near window. More specific morphology classifications, as combinations of these general categories, include indoor with local coverage, outdoor near cell, outdoor dense urban moving, high-rise building close to window, outdoor dense urban stationary, outdoor suburban moving, outdoor suburban stationary, deep indoor no local coverage close to a cell site, rural area moving, rural area stationary, outdoor suburban area edge of coverage mobile, outdoor suburban area edge of coverage stationary, and indoor mid building no local coverage.

For purposes of definition, the indoor classifications include deep indoor (where no significant outside signals can be received), indoor near window (where significant outside signals can be received) and mid indoor (where only weak outside signals may be received, sometimes intermittently).

Generate Assistance Data/Information

At 45, the selected classification (and optionally the level of confidence) is available, and responsive thereto, the UE is controlled in any of a number of ways to more efficiently use its system resources. For example, the classification may be used by a PDE to generate assistance data relating to position location, for example the assistance data can be optimized before sending it to the UE. Using the optimized assistance data, the UE can utilize its system resources more efficiently in determining position. For example, in response to the assistance data, the number of base stations, and/or the number of measurements may be reduced when measurements are subsequently taken by the UE.

The classification can be used in a number of other ways. For example, based upon the classification, thresholds may be varied, and each signal's strength can be tested against that threshold. The classification may be used to enable or disable searches for additional signals. The classification may also be used to adjust the number of signal sources to be searched.

The classification can be used by the PDE to determine whether or not to send unsolicited assistance messages from the PDE to the UE.

The classification can be used to change the search priority (e.g., look first for low elevation satellites instead of high elevation satellites).

The classification can be used to adjust the search window size.

Generally, the classification can be used in a number of ways to change the way in which measurements are taken. Then the second set of measurements may be more useful and efficient.

The level of confidence can be used to modify (or eliminate) any of the actions that would otherwise have been instituted as a result the classification. For example a low level of confidence suggests that the classification may be in error, and therefore a more conservative approach may be taken. On the other hand, a high level of confidence would allow a more aggressive approach to conserving energy.

Morphology Classification Examples

In this example, the wireless technology is CDMA and all available measurements are AFLT (i.e., base station forward link measurements). Typically, the measured AFLT signal strength is expressed as pilot signal-to-noise ratio (SNR, Ec/No). In a CDMA system, the SNR is a function of not only the received power of the desired signal but also of the interference. Therefore, one would have to evaluate all measured signal strength values jointly in order to correctly categorize the user location.

A possible improvement can be achieved if the total received power (RSSI) is used. The total received power includes signals from all base stations operating on the same CDMA frequency. When the total received power is low in an urban environment then the user's position is likely an indoor or otherwise blocked location. The total received power is already part of the IS-801 AFLT measurement report (Provide Pilot Phase Measurement message or Provide General Location Measurement message).

Even further improvement can be achieved if both the individual pilot SNRs and the total received power are used jointly in the location categorization. If in-building coverage is provided by outdoor cells in a dense urban environment, then most likely the UE will be able to find only a few pilot signal. On the other hand, a single strong pilot implies that the user is outdoors and close to a cell site or indoors and the coverage is provided by a repeater or micro-cell. In UMTS systems, the base stations broadcast information about the transmit power of the pilots. Based on the pilot transmit power level, one can determine the type of the cell, which in turn can be used in determining the type of coverage (i.e., indoor vs. outdoor). On the other hand, many pilots with moderate to weak strength may mean that the UE is located outdoors.

A summary of possible scenarios and resulting classifications is listed below in the example using Table 1.

Table 1: Classification example: Total pilot strength and Total received power (for all observed pilots)

Following is a table that shows one simple classification example. This table is used to illustrate generally how a classification may be made, and it should be apparent that other methods for classifying user morphology can be implemented. For example, another more detailed classification is described below, with reference to FIGS. 6A-6D. Many alternative classification systems can be implemented, for example to provide greater detail, and/or to utilize additional measurements in the calculations and decisions.

In the following table, the total pilot strength and the total received power (for all observed pilots) is used to classify the user's morphology.

| All Ec/No | RSSI | Possible classification |
|---|---|---|
| Low | Low | Indoor |
| Low | High | Outdoor |
| High | Low | Rural or edge of coverage |
| High | High | Outdoor, indoor repeater or microcell |

At the outset, it may be noticed that the particular measurements (Ec/No and RSSI) must be categorized as either "high" or "low". For this purpose, a predetermined number may simply be used to determine a "high" or "low" conclusion. Although such a simple system could be satisfactory when the observed measurement is clearly "high" or clearly "low", in many instances the observed measurement may be in a middle range that is not easily categorized as either "high" or "low". In such a situation, an algorithm may be used to more accurately categorize the observed measurement. Also, the proximity of a measurement to the middle range could be used in determining a level of confidence in the classification; for example if each of the measurements is near the middle, the level of confidence would be low. A low level of confidence could be interpreted as "no classification" or a "possible classification" with a low probability of accuracy.

Thus, when implementing a classification system, the actual algorithm for classification may be complex, and may utilize a number of factors or observations in addition to those mentioned in this example.

Note that the Ec/No of the reported pilots are not independent of each other. If one pilot has high Ec/No, then the other pilots have necessarily low Ec/No, as the strong pilot acts as an interferer to the others. One very strong pilot implies that most other surrounding pilots will be too weak even to be measured, therefore the simple existence of one strong pilot means that the number of reported pilots will be small. The opposite statement is not true: the observation of only a small number of reported pilots does not necessarily imply that any of the reported pilots is strong. As mentioned before, observation of a small number of reported pilots and low RSSI generally implies that the device is indoors, which can be helpful for classifying the UE's morphology.

Morphology Classification Example

Reference is now made to FIGS. 6A-6D, which together show a flow chart of operations in one embodiment to classify the user's morphology. These operations use decision thresholds (N1 to N3, and T1 to T12). Decision thresholds may be predetermined based upon analytical or numerical simulation methods. Another particularly suitable method of determining the best decision threshold values is to derive them empirically from a set of sample measurements taken at locations with known morphologies. Once a sufficiently large set of sample data is collected, a number of trial threshold value sets can be chosen, and the sample set can be processed according to each of the trial threshold sets. The threshold set that gives decisions with the lowest error rate (when comparing the test morphology classifier's output decisions to the known morphology at the known locations) can be chosen and used in the morphology classifier 27. Because of the large number of possible trial threshold value sets, it may be important that the trial threshold sets are partitioned. This means that thresholds in independent branches of the classifier operation flow (such as shown in FIGS. 6A-6D) that do not have any impact on each other, can be independently optimized, and therefore not all combinations of them need to be hypothesized.

In general, different geographical areas may require different threshold settings. For example, the prevalent construction materials used in a given area could impact the indoor/outdoor classification when that classification is based in part or fully on RSSI. In this case, a morphology classifier 27 may select operating threshold values from a set of predetermined values, where the selection is based on the geographical area derived from an initial coarse UE location estimate.

The operations shown in FIGS. 6A to 6D may be actually performed at any suitable place, for example in the UE or in a remote server such as a PDE. In these flow charts, for convenience the test results are either "greater than" or "less than". If it turns out that the results are equal, then the test result may be arbitrarily assigned to either "greater" or "less than".

At 60, classification operations start to predict the user's morphology based upon signals received in the UE from various base stations in its vicinity.

At 61, a new set of measurements is obtained. These measurements may include those typically made by the UE, and for purposes of this example, include RSSI, the number of observed pilots, Ec/No, RTD, and the energy profile of each. The dynamic variation of energy profile is also calculated, and any other necessary caculations are performed to provide the necessary measurement values. All these measurements are defined herein, for example in the Definitions section above.

At 62, the measured RSSI value is compared with the first threshold T1 (the RSSI threshold). If the measured RSSI value is less than T1, then operation moves to flow chart position B, which is shown in FIG. 6C. However if the measured RSSI value is more than T1, then at 63, the number of pilots (which is the number of pilots found in a recent search) is compared with the predetermined threshold number N1.

Figure 6A:
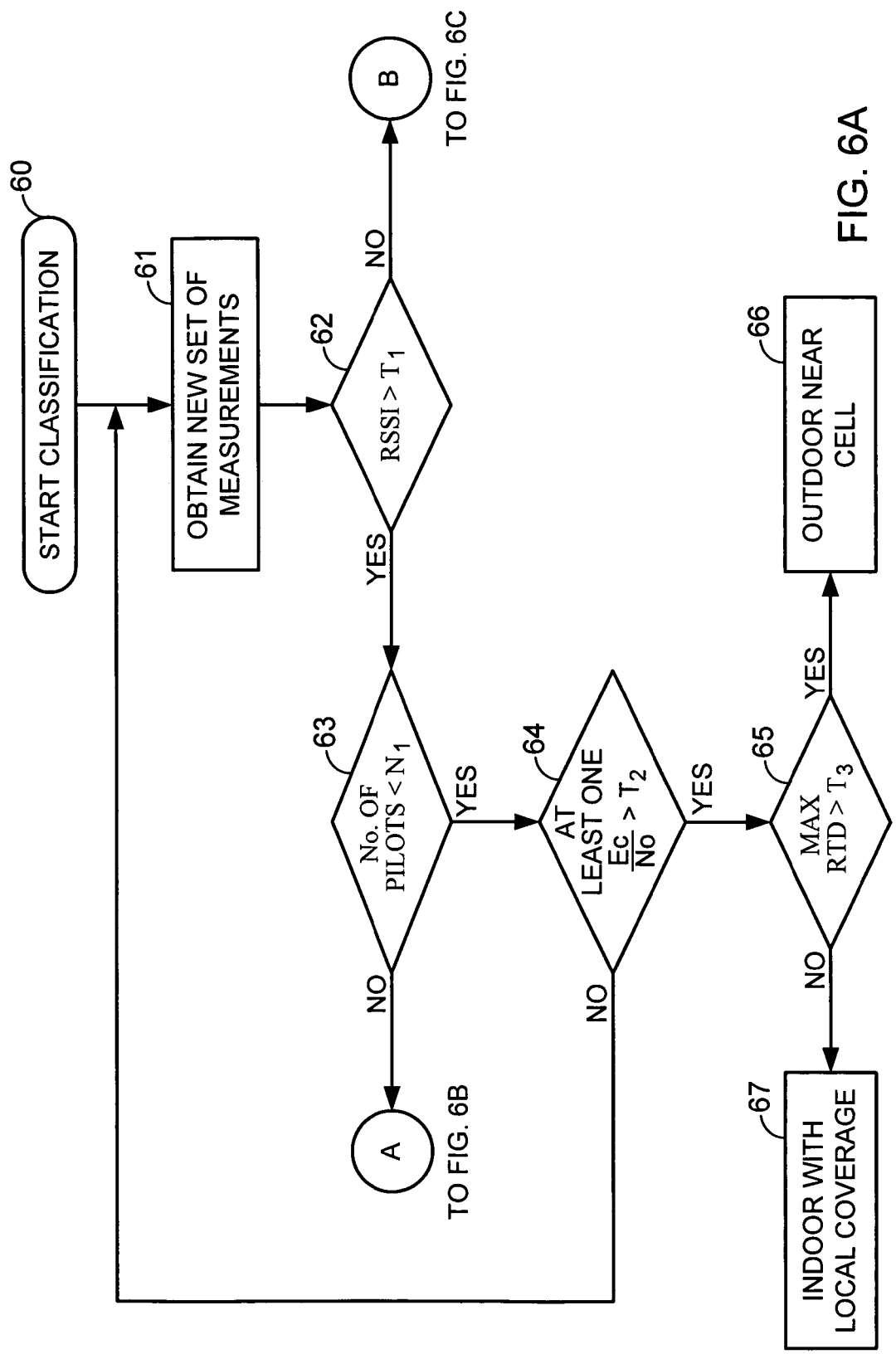
Figure 6B:
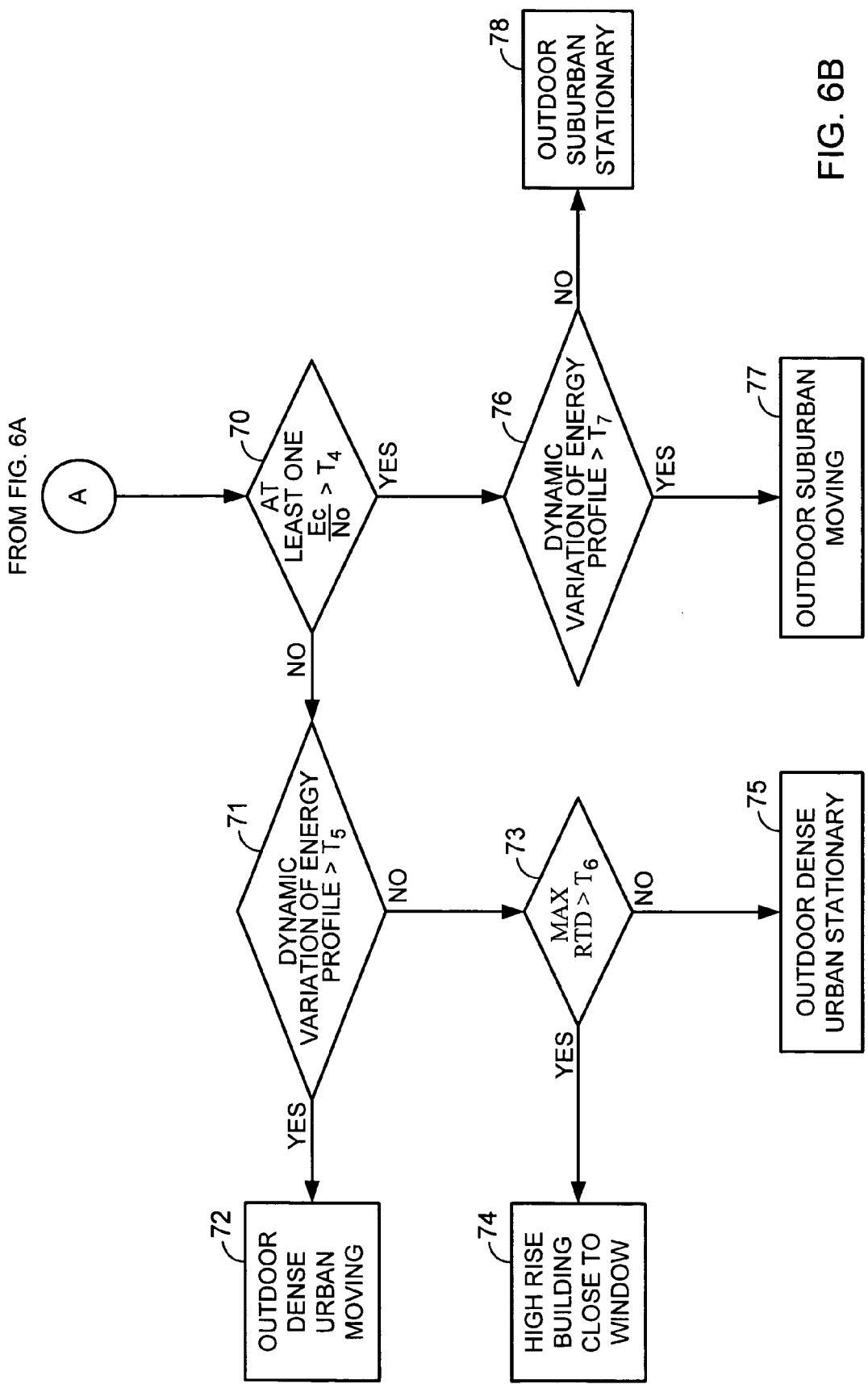
Figure 6C:
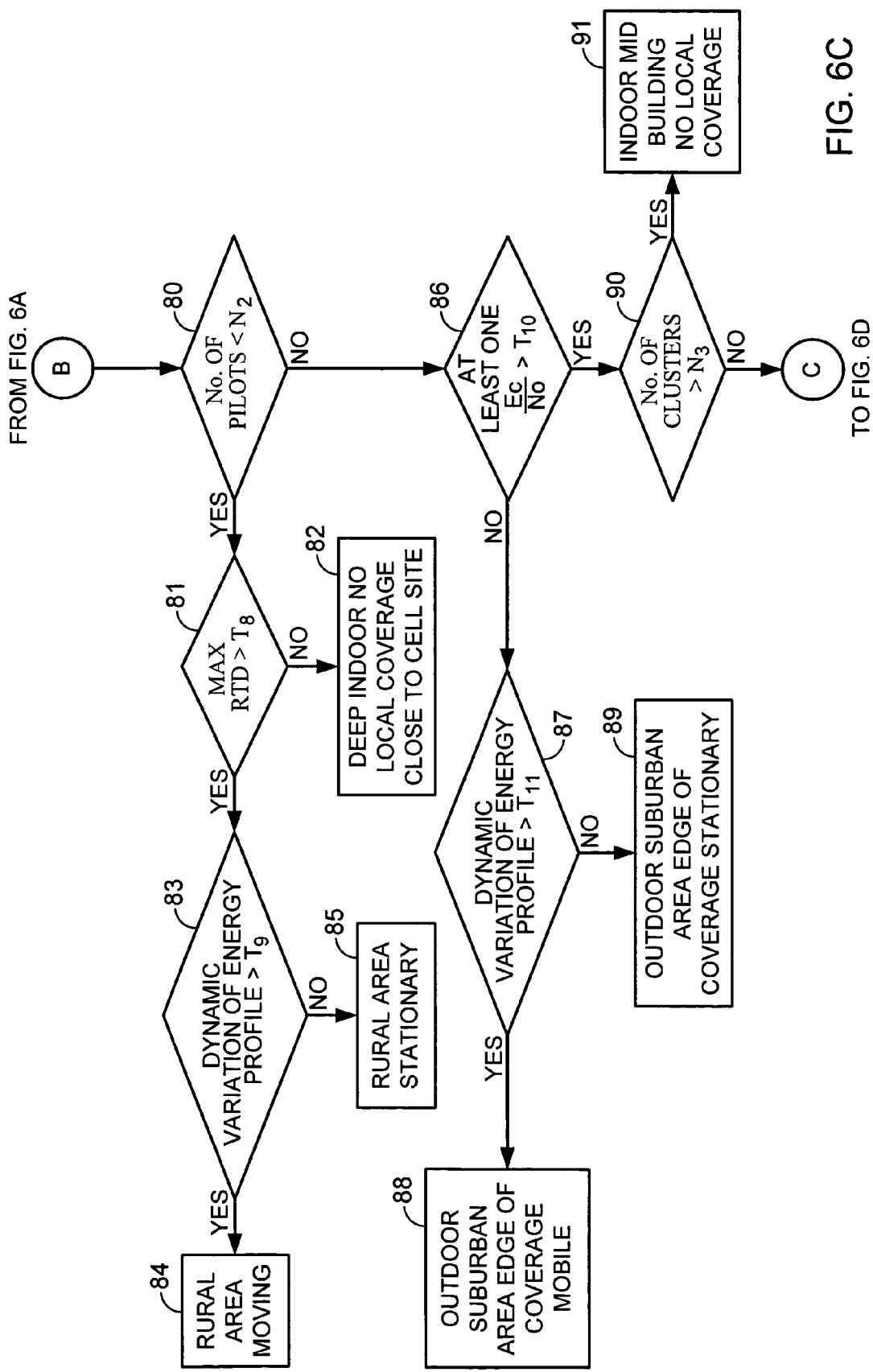

From 63, if the number of pilots is less than the predetermined number N1, then operation moves to flow chart position A, which is shown in FIG. 6B. However, if the number of pilots is less than the number N1, then operation moves to 64.

At 64, a test is performed to determine if (for at least one pilot) the Ec/No is greater than a predetermined second threshold T2 (the S/N threshold). If not, then that means that none of the signals are sufficiently strong upon which to base a classification, and operation returns to 61 to obtain a new set of measurements and repeats the operations flowing therefrom. However, if the Ec/No for at least one pilot is greater than the second threshold, then operation moves to 65.

At 65, a test is performed using the measured round trip distance (RTD). If the maximum RTD (the maximum for all observed pilots) is greater than a predetermined third threshold T3, then at 66 a classification is made that the UE is located outdoors, probably near a base station (cell). However, if the maximum RTD is less than the threshold T3, then at 67 a classification is made that the UE is located indoors, with local coverage (e.g., within a building that has a repeater inside).

FIG. 6B is a flow chart of operations that are performed if, from 63, the number of pilots is less than the predetermined number N1. The first operation in FIG. 6B is at 70.

At 70, a test is performed to determine if Ec/No (for at least one pilot) is greater than a predetermined fourth threshold T4. If less than the predetermined threshold, then the UE is probably in a denser environment, and operation moves to 71.

At 71, the dynamic variation of energy profile is compared with a fifth predetermined threshold T5. If greater, then the large variation indicates that the UE is probably moving, and at 72, a classification is made that the UE is in a dense outdoor urban environment (e.g., with many buildings around), and is moving.

Returning to 71, if the dynamic variation of energy profile is smaller than the fifth threshold T5, then operation moves to 73.

At 73, a test is performed using the measured round trip distance (RTD). If the maximum RTD (the maximum for all observed pilots) is greater than a predetermined sixth threshold T6, then at 74 a classification is made that the UE is located in a high rise building, close to a window. However, if the maximum RTD is less than the sixth threshold T6, then at 75 a classification is made that the UE is located outdoors in a dense urban environment, and is substantially stationary.

Returning to 70, if at least one Ec/No is greater than the predetermined fourth threshold T4, than a relatively strong signal has been found and the UE is probably outdoors in an open (e.g., suburban) setting. Operation then moves to 76.

At 76, the dynamic variation of energy profile is compared with a seventh predetermined threshold T7. If greater, then the large variation indicates that the UE is probably moving, and at 77, a classification is made that the UE is in an outdoor, surburban environment, and is moving. However, if the dynamic variation of energy profile is smaller than the seventh threshold T7, then the UE is classified as outdoor, suburban, and substantially stationary, as shown at 78.

FIG. 6C is a flow chart of operations that are performed if, from 62 (FIG. 6A), the RSSI is less than the first threshold T1. The first operation in FIG. 6C is at 80.

At 80, a test is performed to determine if number of observed pilots is less than a predetermined second number N2. If less than the second number N2, then few pilots have been observed, and operation moves to 81.

At 81, a test is performed using the measured round trip distance (RTD). If the maximum RTD (the maximum for all observed pilots) is greater than a predetermined eighth threshold T8, then at 82 a classification is made that the UE is deep indoors with no local coverage, and near to a base station (cell site). However, if the maximum RTD is less than the eighth threshold T8, then operation moves to 83.

At 83, the dynamic variation of energy profile is compared with a ninth predetermined threshold T9. If greater, then the large variation indicates that the UE is probably moving, and at 84, a classification is made that the UE is in a rural area, and is moving. However, if the dynamic variation of energy profile is smaller than the ninth threshold T9, then at 85 a classification is made that the UE is in an rural environment, substantially stationary.

Returning to 80, if the number of observed pilots is not less (i.e., greater) than a predetermined second number N2, then a relatively larger number of pilots has been observed. Operation then moves to 86.

At 86, a test is performed to determine if Ec/No (for at least one pilot) is greater than a predetermined tenth threshold T10. If less than the predetermined threshold, then operation moves to 87.

At 87, the dynamic variation of energy profile is compared with an eleventh predetermined threshold T11. If greater, then the large variation indicates that the UE is probably moving, and at 88, a classification is made that the UE is in an outdoor suburban environment at the edge of coverage, and is moving. However, if the dynamic variation of energy profile is smaller than the eleventh threshold T11, then at 89 the UE's morphology is classified in an outdoor suburban area, and substantially stationary.

Returning to 86, if Ec/No (for at least one pilot) is greater than a predetermined tenth threshold T10, then a relatively strong pilot signal has been observed. Operation then moves to 90.

At 90, a test is performed to determine if the number of clusters observed is greater than a predetermined third number N3. If the number of clusters is greater, then at 91 a classification is made that the UE is in an indoor environment, mid-building (not near a window), and there is no local coverage. However, if the number of clusters is less, then operation moves to FIG. 6D, as indicated by the flow chart position C.

FIG. 6D is a flow chart of operations that are performed if, from 90 (FIG. 6C), the number of clusters is less than the third number N3. Operation moves from C, and the first operation in FIG. 6D is at 92.

At 92, the dynamic variation of energy profile is compared with a twelfth predetermined threshold T12. If greater, then the large variation indicates that the UE is probably moving, and at 93, a classification is made that the UE is in an outdoor suburban environment, and is moving. However, if the dynamic variation of energy profile is smaller than the twelfth threshold T12, then at 94 the UE's morphology is classified in an outdoor suburban area, and substantially stationary.

Note that in many cases, some a priori knowledge may enable the morphology classifier to bypass some of the decision branches shown in FIGS. 6A to 6D. For example, an initial coarse UE location estimate may already indicate whether the location must be urban, suburban, etc. Another example is that stored information associated with Pilot ID's may provide extra knowledge useful in the morphology classification. If the UE measures, for example, high SNR of a Pilot transmitted by a Base Station known to provide indoor coverage, then this is a strong indication that the UE is indoors, regardless of other factors such as RSSI. Any such external information can be used to improve the reliability of the morphology classifier's decisions.

Using the Morphology Classification

Once the morphology classification has been determined with a sufficient level of reliability, it can be used to generate the assistance data in a number of different ways. A few examples are listed below:

1) The requesting entity may enable/disable further AFLT or GPS searches. For example, if the user location is found to be substantially blocked to GPS signals, then further searches may be disabled for a time in order to avoid wasting hardware resources on extensive signal searches.

2) The morphology classification may be used to govern whether or not to send unsolicited sensitivity assistance messages. If the user location is determined to be indoors but not completely blocked, then the base station can effectively send sensitivity assistance data to the UE to enhance the efficiency of the location reference signal search. However, if the user's location is determined to be outdoors, then sending the sensitivity assistance data is unnecessary and can be avoided, thereby conserving system resources.

3) The number of signal sources to be searched can be adjusted based on the morphology classification.

4) The search window size can be adjusted based on the morphology classification.

The particular level of confidence in the classification may be used to adjust any of the above operations; for example, a low level of confidence might suggest an increase in the search window size and the number of signal sources to be searched.

Simulation Results

Figure 7:
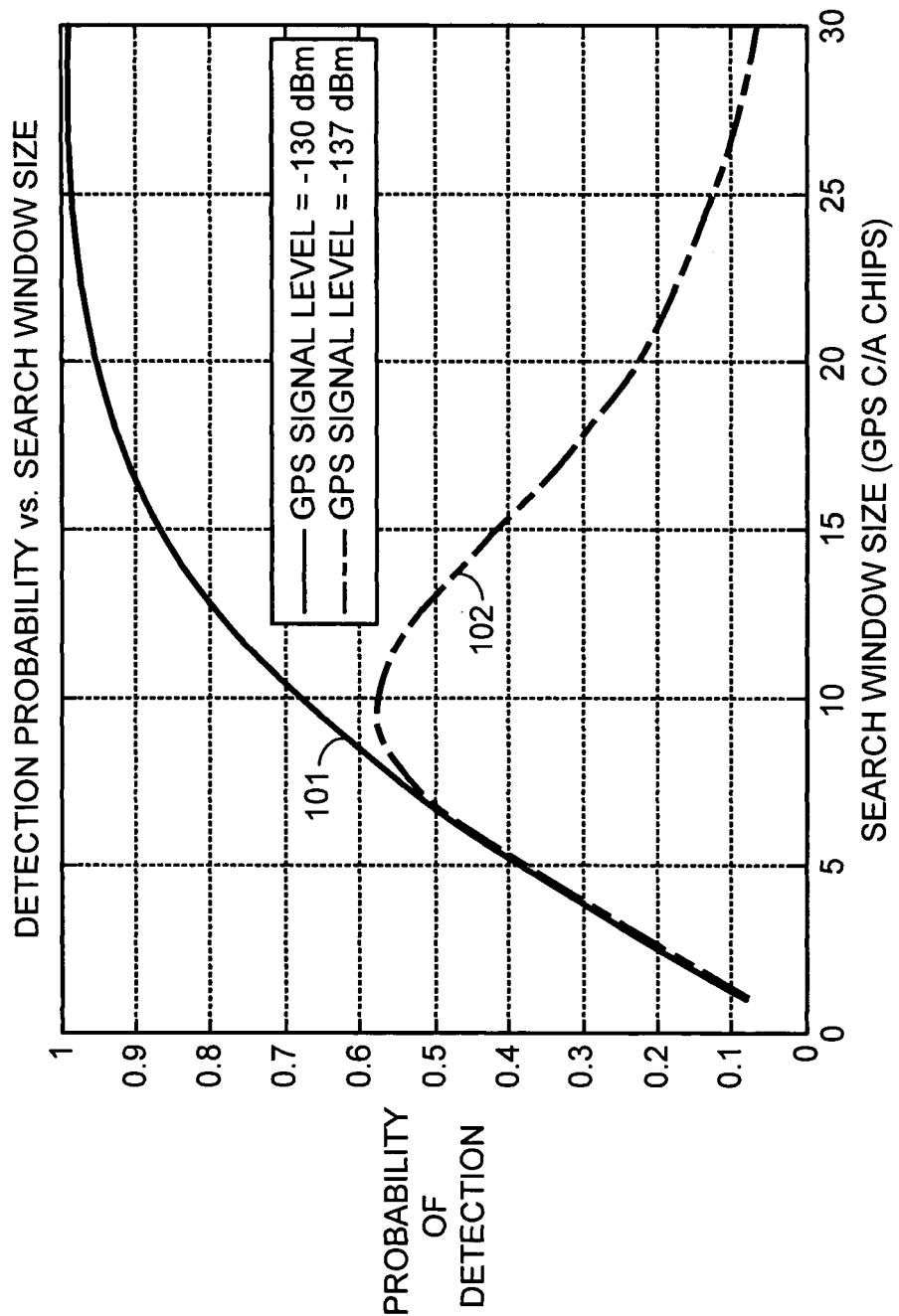
FIG. 7 is a graph that plots the probability of detection as a function of the search window size for two different expected signal levels.

Reference is now made to FIG. 7. As an example, simulations were carried out to demonstrate the utility of one example, the results of which are shown in FIG. 7. Particularly, FIG. 7 plots the probability of detection as a function of the search window size (in GPS C/A chips) for two different expected signal levels. For this purpose two cases were hypothesized: in the first case, the signal strength received from the GPS satellites was assumed to be −130 dBm (corresponding to a clear view of the satellite). In the second case, the signal strength received from the GPS satellites was assumed to be −137 dBm (corresponding to a blocked view of the satellite). In both cases, the UE was directed to search for eight satellites, and the total search time was about three seconds.

In the simulations, sub-cases were considered corresponding to search window sizes varying from 1 C/A chip to 30 C/A chips. For each search window size case, 30,000 measurements were simulated and the detection probability was determined. The detection probability was determined as the relative frequency of the event that both the following conditions were satisfied: 1) the true signal code phase falls within the search window, and 2) the integrated signal plus noise in the true search bin exceeds a detection threshold.

In this simulation, the position of the true signal was assumed to have a Gaussian distribution with a standard deviation of about 10 C/A chips. The detection threshold was determined based on a target 0.0001 effective false alarm rate. The effective false alarm rate is the probability of the integrated noise in any of the search bins within the search window exceeding the detection threshold, therefore making the UE declare finding the GPS signal, even though the GPS signal was not present. The false alarm rate per search bin was calculated from the effective false alarm rate as:

$$FA = 1 - (1 - \text{Effective\_False\_Alarm\_Rate})^{1/WIN}$$

where Effective_False_Alarm_Rate=$10^{-4}$ and WIN is the number of search bins, which here is equal to twice the search window size. The factor of two is the result of the fact that two samples are taken per C/A chip.

Then the threshold can be calculated as:

$$\text{Threshold} = \sqrt{2} \, erf^{-1}(2FA) \cdot \sqrt{\sigma_{noise}}$$

In the above, the measurement noise is approximated as white Gaussian.

The SNR (in dB) of the integrated signal was determined as:

$$SNR = (GPS\_signal\_strength - Thermal\_noise - Receiver\_noise\_figure) + 10 \cdot \log_{10}(Integration\_Time)$$

where GPS_signal strength is either −130 dBm or −137 dBm.

The Thermal_noise is −174 dBm/Hz, which can be obtained as:

$$10 \cdot \log_{10}(300 \cdot k) + 30 = 10 \cdot \log_{10}(300 \cdot 1.38 \cdot 10^{-23}) + 30;$$

Receiver_noise_figure—5 dB; and
Integration_time is calculated as:

$$Integration\_time = \frac{Total\_search\_time}{Num\_SV \cdot WIN}$$

where Total_search_time is 3 s; Num_SV is 8; and WIN is the number of bins to be searched, as described earlier.

With all the assumptions above, the simulation results are shown in the graph of FIG. 7. The plot corresponding to a GPS signal level of −130 dBm is shown at 101, and the plot corresponding to a GPS signal level of −137 dBm is shown at 102. As can be observed from the plots in this example, the detection probability is maximized when the search window size is set to 10 C/A chips if the signal strength is expected to be −137 dBm, while it is maximized if the search window size is set to close to 30 C/A chips when the signal strength is expected to be −130 dBm. Therefore, it is shown that performance can be improved if the search window size is made a function of the expected signal strength.

Note that further improvement could be achieved if the number of satellites to be searched is also made a function of the expected signal strength.

It will be appreciated by those skilled in the art, in view of these teachings, that alternative embodiments may be implemented without deviating from the spirit or scope of the invention. This invention is to be limited only by the following claims, which include all such embodiments and modifications when viewed in conjunction with the above specification and accompanying drawings.

What is claimed is:

1. A method of classifying morphology at a location of a UE (user equipment), in order to assist the UE in efficiently performing position location operations, the method comprising:
   a) receiving a first set of data measurements from the UE, wherein the first set of data measurements are obtained by measuring a first set of signals received in said UE from RF (radio frequency) signal sources within range of said UE, to provide the first set of data measurements;
   b) responsive to said first set of data measurements, classifying a user's first morphology to form a user's first morphology classification;
   c) determining a level of confidence in said user's first morphology classification; and
   d) responsive to said user's first morphology classification and said level of confidence, transmitting position assistance information to the UE, wherein the position assistance information includes:
      first position assistance information including one or more parameters for a search of SPS (satellite positioning system) signals based on the user's first morphology classification; and
      second different position assistance information based on a second different morphology classification, wherein the second different position assistance information is different from the first position assistance information.

2. The method of claim 1 wherein said RF signal sources include a plurality of base stations, and said first set of data measurements include the SNR (signal-to-noise ratio) of each of the RF signal sources, and the RSSI (receive signal strength indicator).

3. The method of claim 1 wherein said RF signal sources include a plurality of base stations, and said first set of data measurements include AFLT (advanced forward link trilateration) measurements.

4. The method of claim 1 wherein said RF signal sources include a plurality of positioning satellites, and said first set of data measurements include GPS (global positioning system) measurements.

5. The method of claim 1 wherein said RF signal sources comprise a plurality of base stations in a CDMA (code division multiple access) network, and said first set of data measurements include at least two of Ec/No (carrier-to-noise ratio), RSSI (receive signal strength indicator), RTD (round trip delay), a number of pilots in a found set, and the dynamic variation of energy profiles among found pilots.

6. The method of claim 1 wherein said user's first morphology classification and second different morphology classification each include at least one of indoor, outdoor, local coverage, no local coverage, proximate to a base station, stationary, moving, urban, suburban, rural, deep indoor, mid indoor, or indoor near window.

7. The method of claim 1 wherein said user's first morphology classification and second different morphology classification each include at least one of indoor with local coverage, outdoor near cell, outdoor dense urban moving, high rise building close to window, outdoor dense urban stationary, outdoor suburban moving, outdoor suburban stationary, deep indoor no local coverage close to a cell site, rural area moving, rural area stationary, outdoor suburban area edge of coverage mobile, outdoor suburban area edge of coverage stationary, or indoor mid building no local coverage.

8. The method of claim 1 further comprising determining if the SNR (signal-to-noise ratio) of at least one of the first set of signals exceeds a minimum threshold before classifying the user's first morphology, and if it does not exceed the minimum threshold, then repeating said measuring the first set of signals to provide a second set of data measurements before classifying the user's first morphology, otherwise continuing with classifying a user's first morphology.

9. The method of claim 1, further comprising:
   determining a previously known location of the UE; and
   wherein said classifying the user's first morphology is further responsive to said previously known location.

10. The method of claim 1 wherein said position assistance information includes position location control information.

11. A method of efficiently utilizing system resources of a UE (user equipment), the method comprising:
   a) measuring a first set of signals received in said UE from RF (radio frequency) signal sources within range of said UE, to provide a first set of data measurements;
   b) accessing position assistance and/or position control information associated with a particular user morphology, wherein the particular user morphology is determined using the first set of data measurements, and wherein the position assistance information is transmitted to the UE based on said particular user morphology and a determined level of confidence of said particular user morphology, wherein said position assistance information including one or more parameters for a search of SPS (satellite positioning system) signals based on the particular user morphology, and wherein the position assistance information includes:
 first position assistance information including one or more parameters for a search of SPS (satellite positioning system) signals based on a particular user morphology classification; and
 second different position assistance information based on a second different morphology classification, wherein the second different position assistance information is different from the first position assistance information; and
c) performing positioning operations, using said position assistance and/or position control information, at the UE comprising processing a second set of signals, and wherein the position control information selectively enables search of a type of positioning signals.

12. The method of claim 11 wherein said RF signal sources include a plurality of base stations, and said data measurements include an SNR (signal-to-noise ratio) of each of the RF signal sources, and an RSSI (receive signal strength indicator).

13. The method of claim 11 wherein said RF signal sources include a plurality of base stations, and said data measurements include AFLT (advanced forward link trilateration) measurements.

14. The method of claim 11 wherein said RF signal sources include a plurality of positioning satellites, and said data measurements include GPS (global positioning system) measurements.

15. The method of claim 11 wherein said RF signal sources comprise a plurality of base stations in a CDMA (code division multiple access) network, and said first set of data measurements include at least two of Ec/No (carrier-to-noise ratio), RSSI (receive signal strength indicator), RTD (round trip delay), a number of pilots in a found set, and a dynamic variation of energy profiles among found pilots.

16. The method of claim 11 wherein said particular user morphology classifications include at least one of indoor, outdoor, local coverage, no local coverage, proximate to a base station, stationary, moving, urban, suburban, rural, deep indoor, mid indoor, or indoor near window.

17. The method of claim 11 wherein said particular user morphology classifications include at least one of indoor with local coverage, outdoor near cell, outdoor dense urban moving, high rise building close to window, outdoor dense urban stationary, outdoor suburban moving, outdoor suburban stationary, deep indoor no local coverage close to a cell site, rural area moving, rural area stationary, outdoor suburban area edge of coverage mobile, outdoor suburban area edge of coverage stationary, or indoor mid building no local coverage.

18. The method of claim 11 further comprising determining if an SNR (signal-to-noise ratio) exceeds a minimum threshold before classifying said particular user morphology, and if the SNR does not exceed the minimum threshold, then repeating said measuring the first set of signals to provide a second set of data measurements before classifying said particular user morphology, otherwise continuing with said classifying said particular user morphology.

19. The method of claim 11 further comprising:
 determining a previously known location of the UE; and
 wherein said classifying said particular user morphology is further responsive to said previously known location.

20. The method of claim 11 wherein said position assistance information includes:
 unsolicited position location sensitivity assistance data received from a network resource remote from the UE;
 control information indicating the UE should adjust a number of signal sources to be searched;
 control information indicating the UE should adjust a search window size; and
 information indicating an expected signal strength of a positioning signal received by the UE.

21. The method of claim 11 further comprising:
 determining a level of confidence in said particular user morphology classification; and
 wherein performing position operations is responsive to said level of confidence and said particular user morphology classification.

22. A wireless apparatus for efficiently performing position location operations to enable system resources to be conserved, the wireless apparatus comprising:
 a receiver including a system configured to measure a first set of signals received in said wireless apparatus from RF (radio frequency) signal sources within range of said wireless apparatus, to provide a first set of data measurements based on the first set of signals, and to receive position assistance information, wherein the position assistance information includes:
  first position assistance information including one or more parameters for a search of SPS (satellite positioning system) signals based on a user's morphology classification of a user's morphology; and
  second different position assistance information based on a second different morphology classification of a different morphology, wherein the second different position assistance information is different from the first position assistance information;
 a morphology classifier configured to classify the user's morphology using said first set of data measurements and to determine a level of confidence in said user's morphology classification; and
 a control system configured to use the position assistance information to control a positioning operation of the wireless apparatus based on the user's morphology and said level of confidence, wherein the control system selectively enables search of a particular type of positioning signal based on the user's morphology.

23. The wireless apparatus of claim 22 wherein said RF signal sources comprise a plurality of base stations in a CDMA (code division multiple access) network, and said first set of data measurements includes at least two of Ec/No (carrier-to-noise ratio), RSSI (receive signal strength indicator), RTD (round trip delay), a number of pilots in a found set, and a dynamic variation of energy profiles among pilots in the found set.

24. The wireless apparatus of claim 22 wherein said morphology classifier includes means for classifying the user's morphology into at least one of indoor, outdoor, local coverage, no local coverage, proximate to a base station, stationary, moving, urban, suburban, rural, deep indoor, mid indoor, and indoor near window.

25. The wireless apparatus of claim 22 further comprising:
 means for determining a level of confidence in said user's morphology classification; and
 wherein said control system controls position operation of the wireless apparatus based on said level of confidence and said user's morphology classification.

26. A method of efficiently utilizing system resources of a UE (user equipment), the method comprising:
 classifying a user's morphology as one of indoor or outdoor based in part on a first set of data measurements determined from a first set of signals received in said UE from RF (radio frequency) signal sources to form a user's first morphology classification;

determining a confidence level of the user's first morphology classification; and responsive to said user's first morphology classification and said confidence level, controlling a position location operation within said UE receiving position assistance information at the UE, wherein the position assistance information includes:
  first position assistance information including one or more parameters for a search of SPS (satellite positioning system) signals based on the user's first morphology classification; and
  second different position assistance information based on a second different morphology classification, wherein the second different position assistance information is different from the first position assistance information.

27. The method of claim 26, wherein controlling the position location operation comprises at least one of:
  enabling/disabling position location determinations,
  adjusting a number of position location signal sources to be searched,
  adjusting a type of position location signal sources to be searched, and
  adjusting a search window size.

28. A mobile device comprising:
  one or more antennas configured to receive a plurality of signals including a first signal set and a second signal set;
  processor circuitry configured to process the first signal set to determine a first set of data measurements indicative of properties of the first signal set and to process the second signal set to determine a second set of data measurements indicative of properties of the second signal set;
  classification circuitry configured to determine a user's RF (radio frequency) environment classification using the first set of data measurements and to determine a level of confidence in said user's RF environment classification;
  receiving circuitry to receive position assistance information, wherein the position assistance information includes:
    first position assistance information including one or more parameters for a search of SPS (satellite positioning system) signals based on a user's first morphology classification; and
    second different position assistance information based on a second different morphology classification, wherein the second different position assistance information is different from the first position assistance information; and
  control circuitry configured to generate position location control information based on the RF environment classification and said level of confidence, including
    first position location control information based on a first RF environment classification and
    second different position location control information based on a second different RF environment classification; and
  positioning circuitry configured to process the second signal set using the position location control information according to a position location technique selectively enabled by the control circuitry and to generate position information for the mobile device based thereon.

29. The mobile device of claim 28, wherein the first signal set comprises a plurality of signals transmitted by terrestrial signal sources, wherein the first set of data measurements comprises measurements indicative of signal strength from the plurality of terrestrial signal sources, and wherein the second signal set comprises a plurality of satellite signals.

30. The mobile device of claim 28, wherein the first position location control information comprises control information indicative of a first search window size associated with the first RF environment classification, and wherein the second different position location control information comprises control information indicative of a second different search window size associated with the second different RF environment classification.

31. The mobile device of claim 28, wherein the positioning circuitry comprises satellite processing circuitry, and wherein the first position location control information comprises control information to control the satellite processing circuitry to disable further satellite searches for a particular time interval.

32. The mobile device of claim 28, wherein the classification circuitry configured to determine the RF environment classification using the first set of data measurements is configured to determine the RF environment classification using at least one received signal strength of the first set of data measurements and a number of detected signals of at least one signal type.

33. The mobile device of claim 28, wherein the first position location control information comprises control information indicative of a first number of sources to be searched associated with the first RF environment classification, and wherein the second position location control information comprises control information indicative of a second different number of sources to be searched associated with the second different RF environment classification.

34. The mobile device of claim 28, wherein the first position location control information comprises control information indicative of a first number of sources to be searched associated with the first RF environment classification, and wherein the second position location control information comprises control information indicative of a second different number of sources to be searched associated with the second different RF environment classification.

35. A mobile device comprising:
  means for receiving a plurality of signals including a first signal set and a second signal set;
  means for processing the first signal set to determine a first set of data measurements indicative of properties of the first signal set and the second signal set to determine a second set of data measurements indicative of properties of the second signal set;
  means for determining a user's RF (radio frequency) environment classification using the first set of data measurements;
  means for determining a level of confidence in said user's first morphology classification;
  means for generating position location control information based on the RF environment classification and said level of confidence, including:
    first position location control information based on a first RF environment classification and
    second different position location control information based on a second different RF environment classification;
  means for selectively enabling a search of position location signals in a second signal set based on the position location control information;
  means for receiving position assistance information, wherein the position assistance information includes:

first position assistance information including one or more parameters for a search of SPS (satellite positioning system) signals based on a user's first morphology classification; and second different position assistance information based on a second different morphology classification, wherein the second different position assistance information is different from the first position assistance information; and means for processing the second signal set using the position location control information and for generating position information for the mobile device based thereon.

36. The mobile device of claim 35, wherein the first signal set comprises a plurality of signals transmitted by terrestrial signal sources, wherein the first set of data measurements comprises measurements indicative of signal strength from the plurality of terrestrial signal sources, and wherein the second signal set comprises a plurality of satellite signals.

37. The mobile device of claim 35, wherein the first position location control information comprises control information indicative of a first search window size associated with the first RF environment classification, and wherein the second position location control information comprises control information indicative of a second different search window size associated with the second different RF environment classification.

38. The mobile device of claim 35, wherein the means for processing the second signal comprises satellite processing circuitry, and wherein the first position location control information comprises control information to control the satellite processing circuitry to disable further satellite searches for a particular time interval.

39. The mobile device of claim 35, wherein the means for determining RF environment classification comprises means for determining the RF environment classification using at least one received signal strength of the first set of data measurements and a number of detected signals of at least one signal type.

40. An apparatus comprising:
non-transitory computer-readable memory storing software instructions comprising software instructions that when executed by one or more processors cause one more machines to perform operations comprising:
accessing information indicative of a first set of data measurements indicative of properties of a first signal set received at a UE (user equipment);
determining a user's RF (radio frequency) environment classification using the first set of data measurements;
determining a level of confidence in said user's RF environment classification;
receiving position assistance information, wherein the position assistance information includes:
first position assistance information including one or more parameters for a search of SPS (satellite positioning system) signals based on a user's first morphology classification; and
second different position assistance information based on a second different morphology classification, wherein the second different position assistance information is different from the first position assistance information; and
generating position location control information based on the RF environment classification and said level of confidence, including:
first position location control information based on a first RF environment classification and second different position location control information based on a second different RF environment classification, wherein the position location control information selectively enables search of a type of positioning signals as part of a positioning technique.

41. The apparatus of claim 40, wherein the operations further comprise:
using the position location control information to process a second signal set; and
generating position information for the mobile device based thereon.

42. The apparatus of claim 41, wherein the first signal set comprises a plurality of signals transmitted by terrestrial signal sources, wherein the first set of data measurements comprises measurements indicative of signal strength from the plurality of terrestrial signal sources, and wherein the second signal set comprises a plurality of satellite signals.

43. The apparatus of claim 40, wherein the first position location control information comprises control information indicative of a first search window size associated with the first RF environment classification, and wherein the second different position location control information comprises control information indicative of a second different search window size associated with the second different RF environment classification.

44. The apparatus of claim 40, wherein the first position location control information comprises control information to control the satellite processing circuitry to disable further satellite searches for a particular time interval.

45. The apparatus of claim 40, wherein the first position location control information comprises control information indicative of a first number of sources to be searched associated with the first RF environment classification, and wherein the second position location control information comprises control information indicative of a second different number of sources to be searched associated with the second different RF environment classification.

46. A method of performing positioning in a mobile device, the method comprising:
receiving a plurality of signals including a first signal set and a second signal set;
processing the first signal set to determine a first set of data measurements indicative of properties of the first signal set and the second signal set to determine a second set of data measurements indicative of properties of the second signal set;
determining a user's RF (radio frequency) environment classification using the first set of data measurements;
determining a level of confidence in said user's RF environment classification;
receiving position assistance information, wherein the position assistance information includes:
first position assistance information including one or more parameters for a search of SPS (satellite positioning system) signals based on a user's first morphology classification; and
second different position assistance information based on a second different morphology classification, wherein the second different position assistance information is different from the first position assistance information; and
generating position location control information to selectively enable a search of a particular type of positioning signal based on the RF environment classification and said level of confidence, including:

first position location control information based on a first RF environment classification and second different position location control information based on a second different RF environment classification; and processing the second signal set using the position location control information to:

perform the search of the particular type of positioning signal, and generate position information for the mobile device based thereon.

47. The method of claim 46, wherein the first signal set comprises a plurality of signals transmitted by terrestrial signal sources, wherein the first set of data measurements comprises measurements indicative of signal strength from the plurality of terrestrial signal sources, and wherein the second signal set comprises a plurality of satellite signals.

48. The method of claim 46, wherein the first position location control information comprises control information indicative of a first search window size associated with the first RF environment classification, and wherein the second different position location control information comprises control information indicative of a second different search window size associated with the second different RF environment classification.

49. The method of claim 46, wherein processing the second signal set and generating position information comprises:

processing the second signal set using satellite processing circuitry, and wherein the first position location control information comprises control information to control the satellite processing circuitry to disable further satellite searches for a particular time interval.

50. The method of claim 46, wherein determining RF environment classification comprises determining the RF environment classification using at least one received signal strength of the first set of data measurements and a number of detected signals of at least one signal type.

51. The method of claim 46, wherein the first position location control information comprises control information indicative of a first number of sources to be searched associated with the first RF environment classification, and wherein the second position location control information comprises control information indicative of a second different number of sources to be searched associated with the second different RF environment classification.

52. A wireless apparatus for efficiently performing position location operations to enable system resources to be conserved, the wireless apparatus comprising:

a receiver configured to receive RF (radio frequency) signals, to measure a first set of the RF signals received, and to provide a first set of data measurements based on the first set of the RF signals;

a classifier configured to use the first set of data measurements to classify a user's RF environment of a user and provide a classification indication, and configured to determining a level of confidence in said user's RF environment classification; and a transmitter configured to produce first position assistance information including one or more parameters for a search of SPS (satellite positioning system) signals in response to the classification indication indicating a first RF environment class and said level of confidence, and to produce second position assistance information, different from the first position assistance information, in response to the classification indication indicating a second RF environment class different from the first RF environment class.

* * * * *